April 11, 1961 G. T. TRIPP 2,979,359
FLANGED WHEELS
Filed March 2, 1959
Fig. 1.
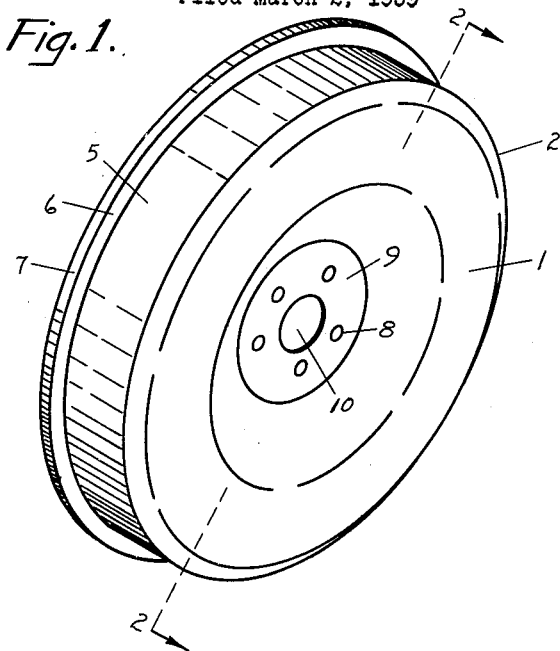
Fig. 4.     Fig. 2.     Fig. 3.
 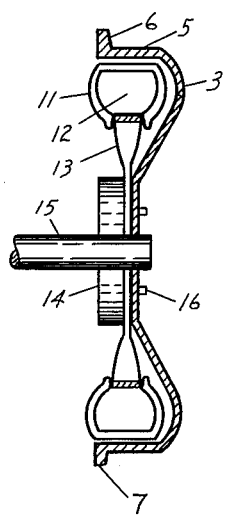 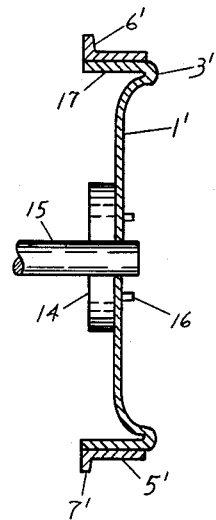
INVENTOR
Guy T. Tripp

United States Patent Office 2,979,359
Patented Apr. 11, 1961

2,979,359

FLANGED WHEELS

Guy T. Tripp, 3903 Exeter Road, Richmond, Va.

Filed Mar. 2, 1959, Ser. No. 796,513

3 Claims. (Cl. 295—8.5)

This invention relates to flanged wheels, but more particularly to a type that can be mounted on the brake drums of land motor vehicles, such as trailer trucks, passenger cars, etc., by, or without, removing the wheel or tire from such vehicle, whereby such highway vehicles may readily be converted and adapted to locomotion on railroad tracks.

An object of the invention envisions such converted vehicles coupled together and transported along standard railroad tracks by the locomotives in current use in trains of several hundred at a time, thereby affording the railroads additional business, which at this time seems essential to their continued operation. The railroads could use a large portion of their present equipment and, in short order, by obvious minor changes and alterations in their coupling and braking devices, be ready for assuming such additional business. In so doing the railroads would effect enormous savings in the maintenance of warehouses, office personnel, also save valuable space in yards now used for empty box cars, as well as many other savings too numerous to mention.

Another object would be to take trucks off the highways voluntarily. If such a plan were in existence, trucking lines could not afford to operate their trucks on the highways in competition with the converted railroad transportation. They could, however, still make door to door and rural deliveries in the usual manner with their same old equipment after a few minor and inexpensive changes. Such use of the old equipment could be effected merely by removing the flanged wheels and reverting to the highway as now used. Other savings, to mention but a few, would be on gas, oil, taxes, tires and general road wear and depreciation of the equipment. The trucking lines could eliminate several tires from their truck bodies, retire a large percentage of their truck cabs and motors, and reduce the number of drivers in proportion to the cabs discontinued.

Another big object that would be accomplished by the invention would be the enormous savings in road building and road maintenance by federal and state governments. It has been estimated that trucks account for 90% of the road damage from vehicle use. With trucks off the highways, the road foundations could be much less expensively built and their maintenance would be reduced to a mere fraction of the present cost.

Another prime object would be a means for effecting a business marriage or association between the railroads and truck lines, envisioning using mostly their old equipment, thus accomplishing the advantages set forth above, and in so doing give death on the highways a holiday by reducing the frightful casualty rate.

For purposes of illustration but not of limitation, an embodiment of the invention is shown in the accompanying drawing, in which:

Fig. 1 is an unmounted perspective view of a flanged wheel;

Fig. 2 is a vertical cross section of the same flanged wheel taken on line 2—2 on Fig. 1, when mounted on the brake drum of a motor vehicle, showing the vehicle tire and tire support in place;

Fig. 3 is a similar vertical cross section of an alternative form of flanged wheel mounted on the brake drum of a motor vehicle and occupying the same general space as the tire and tire support;

Fig. 4 is a vertical cross section of a modification of a rail engaging flange which forms the outer periphery of the wheel, which could be made separate from the main body of the wheel and later welded or press fitted into place on the outer flat rim as shown in Fig. 3.

The peripheral flange shown in Figure 4 could be attached to the flat circular rim shown in either embodiment of Fig. 2 or Fig. 3 if preferred; its mounted illustration on the modification shown in Fig. 3 is merely for showing its adaptability for use with any flat rim.

The embodiment as illustrated in Figs. 1 and 2 of the preferred invention comprehends the use of a flanged wheel of generally cup-shaped formation, the open face of which is of sufficient dimensions to slip over the vehicle wheel and tire without their removal from the vehicle, thereby leaving the vehicle wheel in convenient position for quick removal of the flanged wheel so that the vehicle may again be used as before alteration on highways at the end of the rail transportation. However, the invention is not so limited for attachment without removing the vehicle wheel, but it also comprehends the use of a wheel of slightly different construction as shown in Fig. 3, merely by removing the vehicle wheel and attaching the flanged wheel to occupy the space occupied by the vehicle wheel. Though this latter species would require additional time and involve the inconvenience of mounting another wheel for highway transportation, it could be made of less material and still be of sufficient ruggedness to support the same loads.

While the method of making these flanged wheels constitutes no part of this invention, it is assumed that they could be cast or drawn by common processes well understood in the metal working and casting arts. In either form of the invention, the entire wheel may be cast in an integral piece, or the flange may be made separately and welded or force fitted onto the flat outer rim of the wheel. The separate rim might have the advantage of using a more wear-resistant metal for contact with the railroad rail, while using a less expensive metal for the main body of the wheel.

The illustrated embodiment of the preferred invention comprises an outer shell 1 of metal of substantial rigidity compressed or molded into shape to conform to the inflated tire 11 and its supporting structure 13. The shell 1 at the outer edge 2 is inwardly turned or compressed to form a flat circular rim 5, the inner edge of which is angularly inclined and extends outwardly as at 6 for contacting the inner edge of the railroad rail and guiding the wheel in operative rolling contact at 5 with the top of the rail.

The width of the rail contact surface 5, shown in Fig. 2, would depend upon the width or thickness of the tire on the vehicle over which the flanged wheel is mounted, and also upon the position of the wheel shell in relation to the railroad rails over which it is to be translated.

At the axle center of the shell 1 is formed a round opening 10 of sufficient size to accommodate the end of an axle 15. Around central opening 10 is a flat circular or annular surface 9 conforming to the outer surface of the vehicle's brake drum 14 and of sufficient width to accommodate a series of holes 8 for the purpose of securing the flanged wheel to the brake drum with the same bolts or lugs 16 (or with longer ones where the wheel is not removed), as used to secure the wheel 13 and tire 11 to the brake drum of the vehicle. The open space 12 within the tire 11 is merely to indicate the air space in the inflated tire 11, and its relation to the outer shell 1 and flange or rim 5.

The outer rim or flange 7 represents the extreme overall diameter of the flanged wheel after all its parts have been assembled. The inner vertical edge of flange 6 would be the surface contacting the top inner surface of the railroad rail, thus functioning as a guide to retain the flanged wheel in operative position for translation along the rails.

The flat circular rim 5 may be of any desired thickness and bears the weight of the load in its contact with the upper surface of the railroad rail when in operation, while its outer surface extends laterally to the outer edge of the wheel.

The outer surface 3 of the shell 1 is an open surface providing space for any adjustment that might be necessary in fitting the outer flanged rim to conform to the width of the rails of the railroad track.

In the modification illustrated in Fig. 3, the flat outer rim portion 5' is welded or otherwise integrally fitted onto the top flat circular surface 17 which is an integral part of the outer shell 1', similar to shell 1 of the preferred form, and with the flange 7' which is provided with an angularly inclined surface 6', supports and guides the flanged wheel along the rail of the track. As before stated, the separate rim and flange 5', 7', illustrated in Fig. 4, and shown mounted in Fig. 3, is optional in the construction of the flanged wheel of the invention. Similarly, the use of the modified wheel of Fig. 3 instead of the form illustrated in Fig. 2 is optional, depending on the later use of the vehicle on the highways.

From the foregoing detailed description and objects of the invention, its manufacture and use on railway tracks is believed to be obvious to those familiar with such vehicles. It is to be understood, however, that changes in details of construction and arrangement of parts are comprehended in the application and reduction of the invention to practice, and any such obvious changes and alterations thus effected do not depart from the spirit of the invention. This would apply especially to shape and size of the related parts. Also, the shell 1 could have cut-out openings or areas to conserve material and reduce weight without seriously affecting the load-supporting strength of the flanged wheel.

In view of the foregoing considerations relative to various obvious changes in details of construction, I desire to be limited only by the scope of the appended claims.

I claim:

1. A supporting wheel for heavy duty trucks and other similar land vehicles which is adapted to replace the heavy duty tires in common use on highways whereby said trucks or other vehicles may be coupled together in series and operatively connected to the coupling on railroad cars for transportation on railroad tracks, comprising, a circular, shield-like continuous member of a diameter and rigidity to support the truck chassis and its depending appendages out of contact with the railroad bed, the central portion of said wheel being substantially flat and surrounding a central circular opening of sufficient size to accommodate the hub cap of the axle of said truck, said central opening being circumscribed by a plurality of smaller openings for the passage of bolts to secure the wheel to said truck or motor vehicle, the outer peripheral portion of said wheel shaped to form a circular trough on the inner face of sufficient size to receive the outer face of the usual balloon tire in common use on such trucks without deflation, said wheel terminating at its outer edge in an angular inturned flat flange-like circular rim of a width substantially equal to that of a railroad track rail, and conforming to the surface of said rail, and the inner edge of said flange-like rim having an angular flange substantially perpendicular to said flat surface and extending outwardly therefrom for contact with the inner face of said rail for guidance in translating said motor vehicle along said railroad track.

2. For use in converting a land vehicle of the type used in the trucking industry on highways for transportation on railroad tracks, a rigid, metallic wheel of high compressible resistance equal to or slightly exceeding the overall diameter of the tires in common use on heavy duty trucks, said wheel having a relatively flat disc-like central portion surrounding a central opening of sufficient dimensions to accommodate or receive the axle hub of said motor vehicle, said opening being circular and surrounded by a circular row of smaller holes to accommodate bolts for securing said wheel to said vehicle in operative position for transportation on a railway track, said wheel being curved outwardly adjacent its peripheral portion and then abruptly inwardly at a sharp angle and shaped to provide a flat circular rim, said rim being bisected by the projected plane of said flat central portion, the outer face of said rim being normal to the vertical faces of said wheel, said rim being provided with an angularly and outwardly inclined inner flange to engage the inner face of a railroad rail for guidance of said wheel along said railroad track.

3. A flanged wheel of substantial rigidity and compression resistance for attachment to a motor vehicle without removing the tire from said vehicle for transforming such vehicle for transportation along a railroad track, comprising a circular shield-like member of an overall diameter slightly exceeding that of the vehicle tires in common use on heavy duty trucks, said shield-like member having a substantially flat central portion surrounding a central circular opening of sufficient diameter to accommodate the axle hub and hub cap of said motor vehicle, said central opening being circumscribed with a plurality of smaller openings or holes for the passage of bolts to secure said wheel to said motor vehicle, the outer portion of said wheel being outwardly and then inwardly curved to form a shallow, trough-like depression on its inner face of a size and shape to receive the outer face of a balloon tire, the extreme outer edge of said wheel being inwardly reversed at a relatively sharp angle so as to provide an outer flat circumferential rim of such shape and lateral dimension as to engage and conform to the size and surface of the top of a railroad rail, and a circular plate of relatively high resistance to abrasion integrally secured as by welding to said outer flat rim and having an outer flat surface for contact with the top of a railroad rail and of a similar width, and said plate having an angular outwardly projecting rim at its inner edge for engagement with the inner face of said rail for guiding said wheel and vehicle for transportation along said railway track.

References Cited in the file of this patent

UNITED STATES PATENTS

| | | |
|---|---|---|
| 989,332 | Burrus | Apr. 11, 1911 |
| 1,330,384 | Motasky | Feb. 10, 1920 |
| 1,515,212 | Kasper | Nov. 11, 1924 |
| 2,030,243 | Corts | Feb. 11, 1936 |
| 2,316,502 | Carman | Apr. 13, 1943 |

FOREIGN PATENTS

| | | |
|---|---|---|
| 457,586 | Great Britain | Dec. 1, 1936 |
| 367,057 | Italy | Jan. 14, 1939 |